(12) United States Patent
Arsenault

(10) Patent No.: US 6,757,980 B2
(45) Date of Patent: Jul. 6, 2004

(54) WEED TRIMMER SHIELD KIT

(76) Inventor: Anthony J. Arsenault, 1990 Needmore Rd., Xenia, OH (US) 45385

( * ) Notice: Subject to any disclaimer, the term of this patent is extended or adjusted under 35 U.S.C. 154(b) by 59 days.

(21) Appl. No.: 10/216,889

(22) Filed: Aug. 13, 2002

(65) Prior Publication Data
US 2004/0031157 A1 Feb. 19, 2004

(51) Int. Cl.⁷ .............................. B26B 29/00; B26B 7/00
(52) U.S. Cl. ......................... 30/286; 30/276; 30/DIG. 5
(58) Field of Search ..................... 30/276, 286, DIG. 5, 30/347; 56/12.5, 12.7

(56) References Cited

U.S. PATENT DOCUMENTS

| | | | | |
|---|---|---|---|---|
| 4,447,953 A | * | 5/1984 | Lombardino et al. | 30/382 |
| 5,077,898 A | * | 1/1992 | Hartwig | 30/276 |
| 5,423,126 A | | 6/1995 | Byrne | |
| 5,477,665 A | * | 12/1995 | Stout | 56/16.7 |
| 5,493,784 A | * | 2/1996 | Aiyama | 30/276 |
| 5,524,349 A | | 6/1996 | Dolin | |
| D373,712 S | | 9/1996 | Bridgers | |
| 5,651,418 A | * | 7/1997 | Jerez | 172/14 |
| 5,924,205 A | | 7/1999 | Sugihara et al. | |
| 5,996,234 A | * | 12/1999 | Fowler et al. | 30/276 |
| 6,226,876 B1 | | 5/2001 | Ezell | |
| 6,324,765 B1 | * | 12/2001 | Watkins, Sr. | 30/276 |
| 6,665,942 B2 | * | 12/2003 | Richardson et al. | 30/276 |

* cited by examiner

Primary Examiner—Allan N. Shoap
Assistant Examiner—Isaac N Hamilton
(74) Attorney, Agent, or Firm—Richard C. Litman

(57) ABSTRACT

A transparent plastic shield kit for hand-held weed trimmers of various designs is disclosed. The kit includes a substantially square, transparent, planar shield with a vertical U-shaped slot that divides its upper half in equal parts. Installed on a trimmer shaft by a clamp either with or without an extension arm between the clamp and the shield, the kit allows the trimmer operator to have a protected view of the trimmer cutting head in use, while giving the operator full-body protection from debris thrown by the cutting head.

7 Claims, 4 Drawing Sheets

US 6,757,980 B2

WEED TRIMMER SHIELD KIT

BACKGROUND OF THE INVENTION

1. Field of the Invention

The present invention relates to hand-held weed trimmers. More specifically, the invention is a transparent shield kit with means to attach it to hand-held weed trimmers of various designs.

2. Description of the Related Art

Hand-held trimmers for cutting grass, weeds, and light brush are often equipped with guards that incompletely cover rapidly rotating cutting members, such as filaments, blades, and rods. Trimmers are manufactured with partially exposed cutting members to allow trimmer operators to view cutting areas during use. Consequently, small stones and trimmings are frequently thrown or deflected toward the trimmer operator.

There is a need for an economical kit to add a lightweight shield to commonly available hand-held weed trimmers and, subsequently, protect operators from debris thrown by the weed trimmers during use without obscuring their view of the area being cut.

The present invention solves these problems by providing a transparent shield, an extension arm, and a clamp to pivotally attach the shield to the elongate tubular shaft between the handle and cutting head common to hand-held trimmers.

The related art of interest describes various weed trimmer shields, but none discloses the present invention.

U.S. Pat. No. Des. 373,712 issued to John C. Bridgers shows a debris shield fastened to a clamp that mounts on the shaft of a weed trimmer. Bridgers shows a shield that is substantially rectangular, unlike the square, slotted shape of the preferred embodiment.

U.S. Pat. No. 5,924,205 issued to Tomohito Sugihara and Hajime Tomita describes a pivotally adjustable protective cover for a trimmer. Sugihara et al. do not discuss either an extension arm or a slotted design for the rigid upper plate portion of the cover. Sugihara et al. recommend a guard assembly with a plurality of elastic members not part of the preferred embodiment.

U.S. Pat. No. 5,423,126 issued to Steven E. Byrne discloses a flail trimmer with a second embodiment that includes a "rear" guard that attaches directly to a portion of the edge of the cone shaped guard on Byrne's invention. Unlike the present invention, Bryne's "rear" guard is not easily adaptable to fit other trimmers.

U.S. Pat. No. 5,524,349 issued to Earl S. Dolin describes a protective skirt hanging from two rods held by a clamp on opposite sides of a trimmer shaft so that the longitudinal axes of the rods are substantially the same. Dolin describes a vertically disposed protective skirt, unlike the rigid shield of the preferred embodiment that can easily be adjusted to any position from vertical to horizontal.

U.S. Pat. No. 6,226,876 issued to Thomas E. Ezell describes a variety of embodiments for debris shields suspended from L-shaped and straight brackets. Each of Ezell's embodiment describes a bracket with a clamp at one end with a substantially rectangular debris shield suspended from the other end. Ezell relies on a variety of embodiments to fit different trimmer shafts, unlike the preferred embodiment that accommodates a wide variety of trimmers.

None of the above inventions and patents, taken either singularly or in combination, is seen to describe the instant invention as claimed. Thus a kit for a weed trimmer shield solving the aforementioned problems is desired.

SUMMARY OF THE INVENTION

The present invention is a kit for a weed trimmer shield to fit between handle and cutting head on hand-held weed trimmers with straight, angular, arched, or other type shafts. The kit includes a shield that is substantially square, transparent, and planar with a U-shaped, vertical slot of a predetermined width and length that separates the upper quarters of the shield. Additionally the kit includes a clamp, an extension arm, and finger-tightened fasteners, such as wingnuts and bolts.

The shield is pivotally attached to the extension arm on a trimmer with an angled, arched, or other shaft design that rises significantly above the ground near the cutting head. The extension arm is pivotally attached to the clamp that is fixed on the trimmer shaft. The clamp and extension arm are adjusted so that the base of the shield is at ground-level when in use. In this arrangement, the trimmer shaft passes through the upper portion of the slot or directly above the slot in the shield.

In a second embodiment, the extension arm is not used. The shield is pivotally attached to the clamp on a trimmer with a straight shaft that joins the cutting head at a sharp angle relative to the ground. The clamp is positioned on the trimmer shaft so that the base of the shield is at ground-level during use. In this arrangement, the trimmer shaft passes through the end of the U-shaped slot, substantially at the center of the shield.

The shield is manufactured from plastic or other shock absorbing material that is substantially transparent, allowing the operator to see what is being cut while giving the operator full-body protection from rocks, trimmings, and other debris thrown from the trimmer cutting head. Finger-operated fasteners allow the shield to be easily removed from the trimmer for cleaning.

Accordingly, it is a principal object of the invention to provide a kit for a shield that can be easily fitted by an unskilled person onto hand-held weed trimmers that have straight, angled, arched, or other shaft configurations.

It is another object of the invention that the shield protect the operator of the trimmer from rocks, trimmings, and other flying debris thrown by the trimmer.

It is another object of the invention to give the operator a protected view of weed trimmer cutting head while in use.

It is a further object of the invention to provide a shield for a weed trimmer attachable to the trimmer shaft either with or without an extension arm.

It is a still further object of the invention to provide a shield for a weed trimmer that is readily removable for cleaning.

It is still another object of the invention to provide improved elements and arrangements thereof for the purposes described that are inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

The present invention is a kit for a shield for hand-held weed trimmers. Light-weight, molded pieces of the kit include a slotted, planar, transparent shield 20, an extension arm 30, and a clamp 40.

Figure 1:
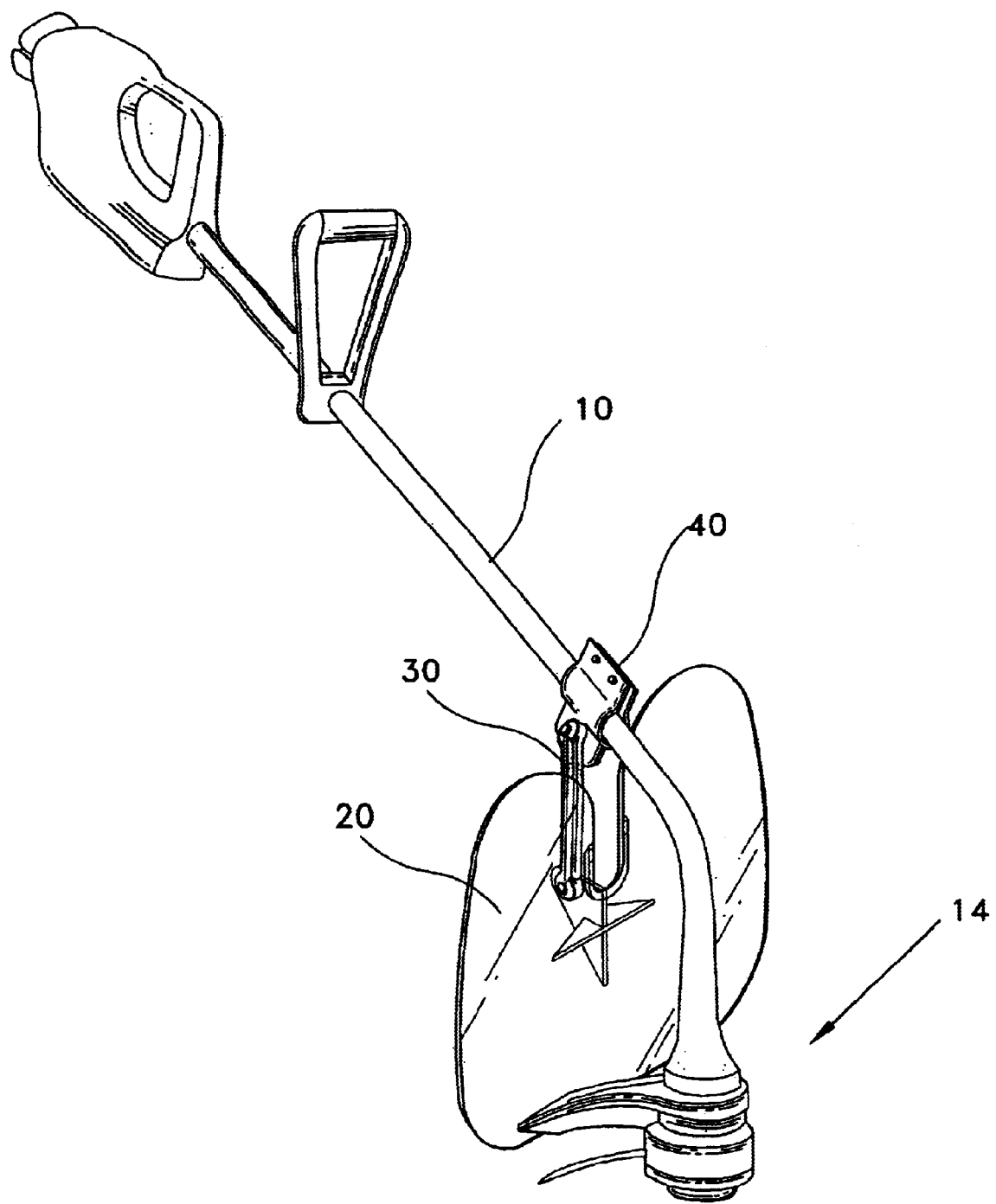
FIG. 1 is a perspective view of a first embodiment of a kit for a shield installed on a weed trimmer with an arched shaft according to the present invention.

FIG. 1 illustrates a perspective view of a first embodiment of the shield kit installed on a weed trimmer with an arched shaft 10. The shield portion 20 of the kit is pivotally attached to the lower end of an extension arm 30. The upper end of the extension arm 30 is pivotally attached to the clamp 40.

Figure 2:
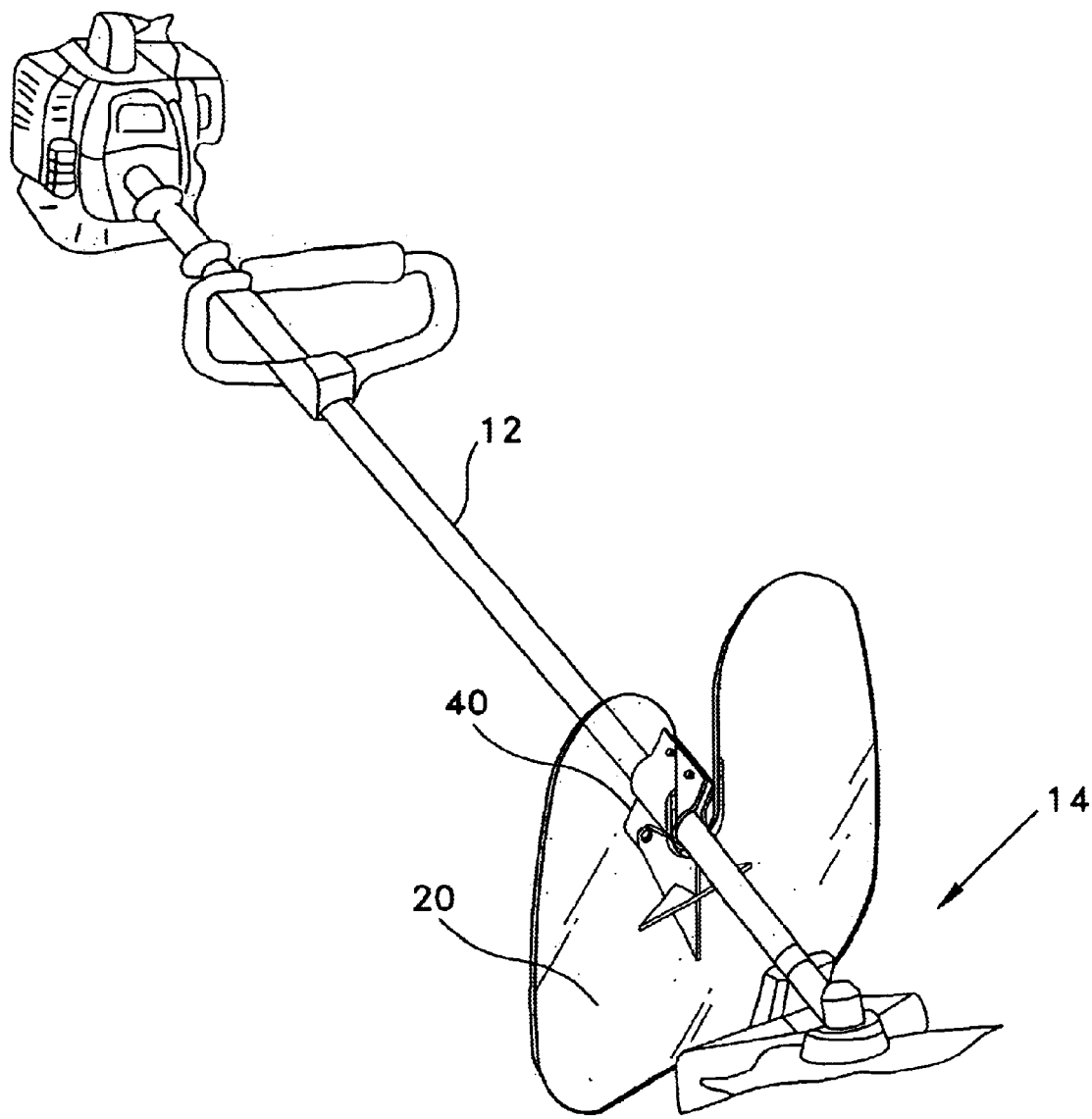
FIG. 2 is a perspective view of a second embodiment of a kit for a shield installed on a weed trimmer with a straight shaft according to the present invention.

FIG. 2 shows a perspective view of a second embodiment of the present invention that does not employ an extension arm. In this embodiment, the shield 20 is pivotally attached to the clamp 40 on a weed trimmer with a straight shaft 12.

Figure 3:
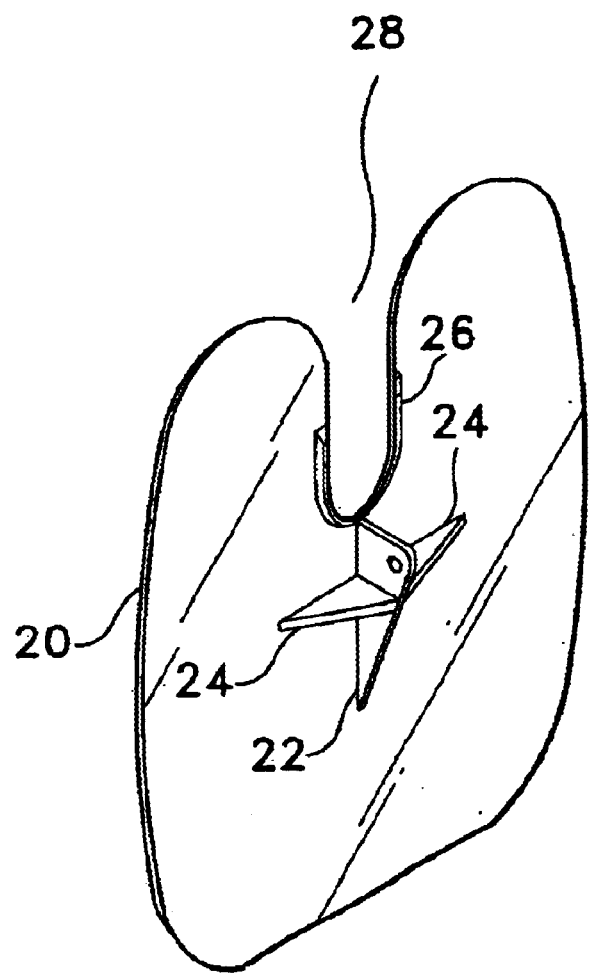
FIG. 3 is a perspective view of the shield portion of the kit for a shield for a weed trimmer according to the present invention.

FIG. 3 more clearly shows the support flange 22, ribs 24, and reinforced collar 26 that protrude from the side of the shield 20 installed toward the operator and away from the trimmer head 14. A U-shaped slot 28 of a predetermined width bisects the upper half of the shield along its vertical axis and ends substantially at the center of the shield. A U-shaped reinforced collar 26 surrounds the bottom end of the slot and abuts the substantially triangular support flange 22 that protrudes at a right angle from the surface of the shield with its longest edge on the vertical axis of the shield 20. Two right triangular ribs 24 rise from the surface of the shield to meet opposite sides of the flange substantially at its longitudinal center.

Figure 4:
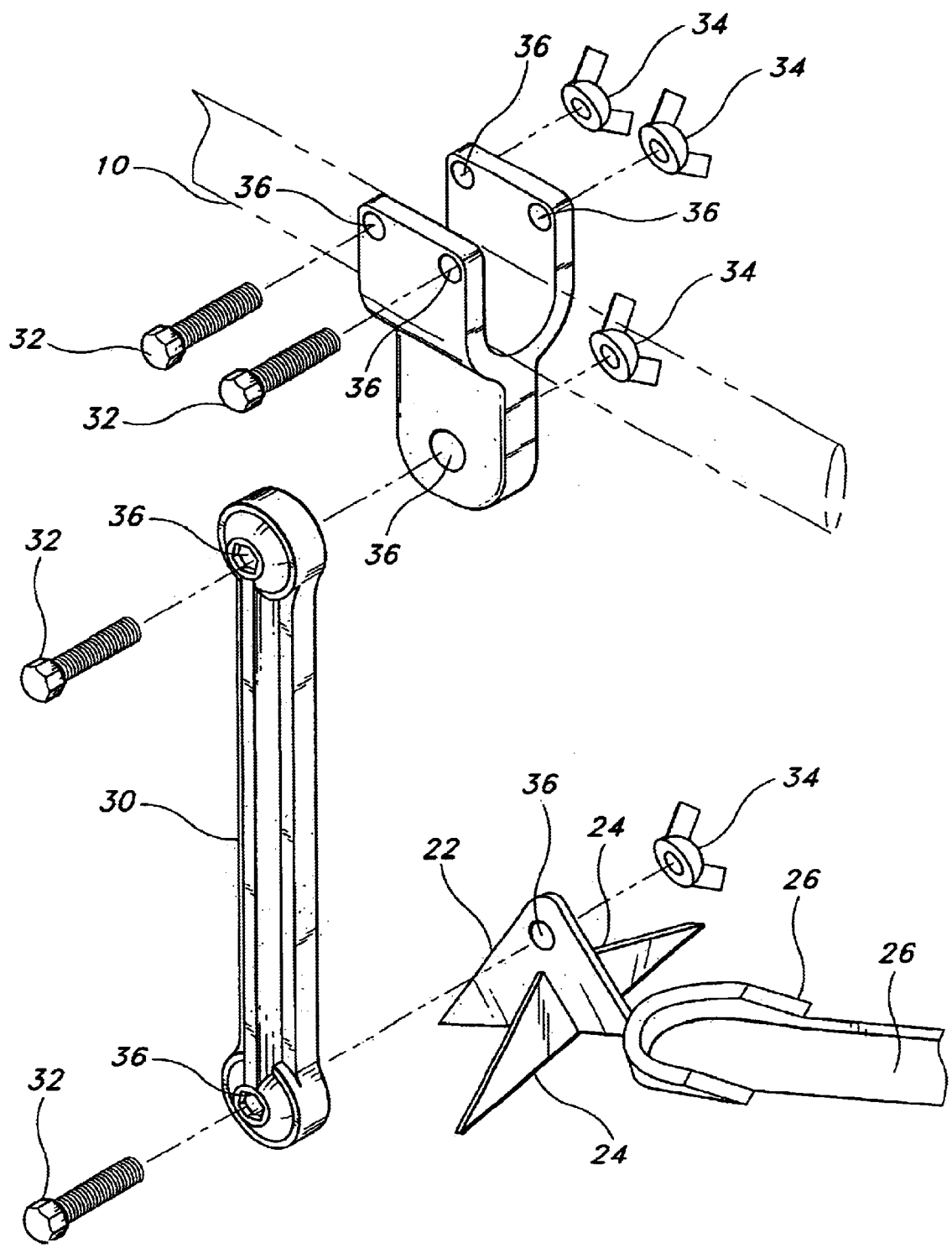
FIG. 4 is an exploded perspective view of the members of the kit used to fasten and position a shield on a weed trimmer according to the present invention.

FIG. 4 is an exploded perspective view of the members of the shield kit that pivotally connect the shield 20 to the trimmer shaft 12. Bolts 32 inserted in through holes 36 in the upper section of clamp 40 are drawn tight by wingnuts 34 to secure the clamp 40 to trimmer shaft 12. The extension arm 30, is shown in position to be attached to the clamp 40 and the support flange 22. Bolts 32 inserted in through holes 36 in the upper end of the extension arm and the lower section of the clamp 40 are drawn tight by wingnuts 34 to form pivotally adjustable connections at each end of the extension arm.

In use, the trimmer operator is able to view the cutting area through the shield while protected head-to-toe from debris thrown by the rapidly rotating cutting element in the trimmer head. As shown in FIG. 1 and FIG. 2 the present invention is easily mounted on a trimmer with an arched shaft 10 or a straight shaft 12 so that the top of the shield 20 is fixed between the operator's face and eyes and the trimmer head. Additionally, to protect the operator's feet and legs from flying debris, the base of the shield 20 is installed so that it is at ground-level.

As shown in FIG. 1, the extension arm 30 is installed between the trimmer clamp 40 and the shield support flange 22 on trimmers with shafts that are arched, angular, or otherwise meet the trimmer head from above. The extension arm 30 allows the shield 20 to reach low enough to protect the operator's feet and legs from flying debris while positioned to give the operator a protected view of the area being cut. Whereas, in the second embodiment, as shown in FIG. 2 on a trimmer with a straight shaft 12 that meets the trimmer head at a sharp angle to the ground, the shield support flange 22 connects directly with the clamp 40. Further, the shield offers the operator head-to-toe protection from flying debris.

Also shown in FIG. 2 in the second embodiment of the present invention, the trimmer shaft 12 passes through the end of the slot 28. A U-shaped reinforced collar 26 surrounds the end of the slot 28 to protect this area from splits caused by vibration or collision with the trimmer shaft 12 during use.

It is to be understood that the present invention is not limited to the embodiments described above, but encompasses any and all embodiments within the scope of the following claims.

I claim:

1. A transparent shield kit for attachment to weed trimmers comprising:

a substantially square, planar, transparent plastic shield of a predetermined thickness, width, and height, and an upper edge and a geometric center;

a vertical U-shaped slot of a predetermined length and width that divides said shield from the mid-point of its upper edge to a point near its said geometric center;

means for pivotally connecting said shield to other members of the shield kit disposed abutting the end of said slot, a clamp;

means for drawing said clamp tight around a weed trimmer shaft;

means for pivotally connecting said clamp to other members of the shield kit, and a rigid, elongate, extension arm of predetermined length, and having a plurality of through holes used to pivotally connect said arm to said shield and said clamp;

whereby the operator of a weed trimmer equipped with said shield kit will have full-body protection from debris thrown by the trimmer cutting head, and also have a protected view of said cutting head while in use.

2. The kit according to claim 1, further comprising a pivot assembly connecting said shield to said clamp.

3. The kit according to claim 1, wherein said shield further comprises a contour peripheral configuration of said shield toward the trimmer cutting head.

4. The kit according to claim 1, wherein said clamp is made of a plastic material.

5. The kit according to claim 1, wherein said clamp is made of metal.

6. The kit according to claim 1, wherein said rigid, elongate extension arm is made of a plastic material.

7. The kit according to claim 1, wherein said rigid, elongate extension arm is made of metal.

* * * * *